No. 804,472. PATENTED NOV. 14, 1905.
C. HORNAL.
ENGINE.
APPLICATION FILED NOV. 29, 1904.
5 SHEETS—SHEET 1.
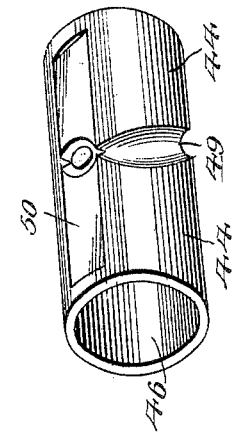
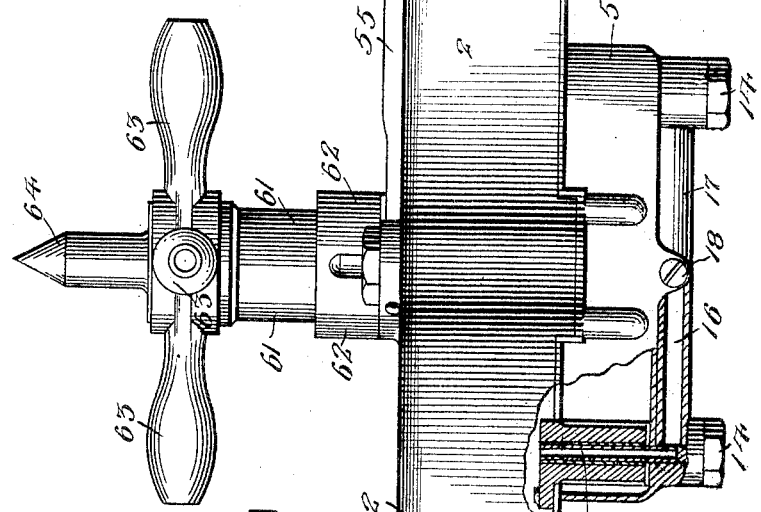
Witnesses
Frank B. Hoffman.
W. H. Clarke.
Inventor
Colin Hornal.
By
Victor J. Evans
Attorney No. 804,472. PATENTED NOV. 14, 1905.
C. HORNAL.
ENGINE.
APPLICATION FILED NOV. 29, 1904.
5 SHEETS—SHEET 2.
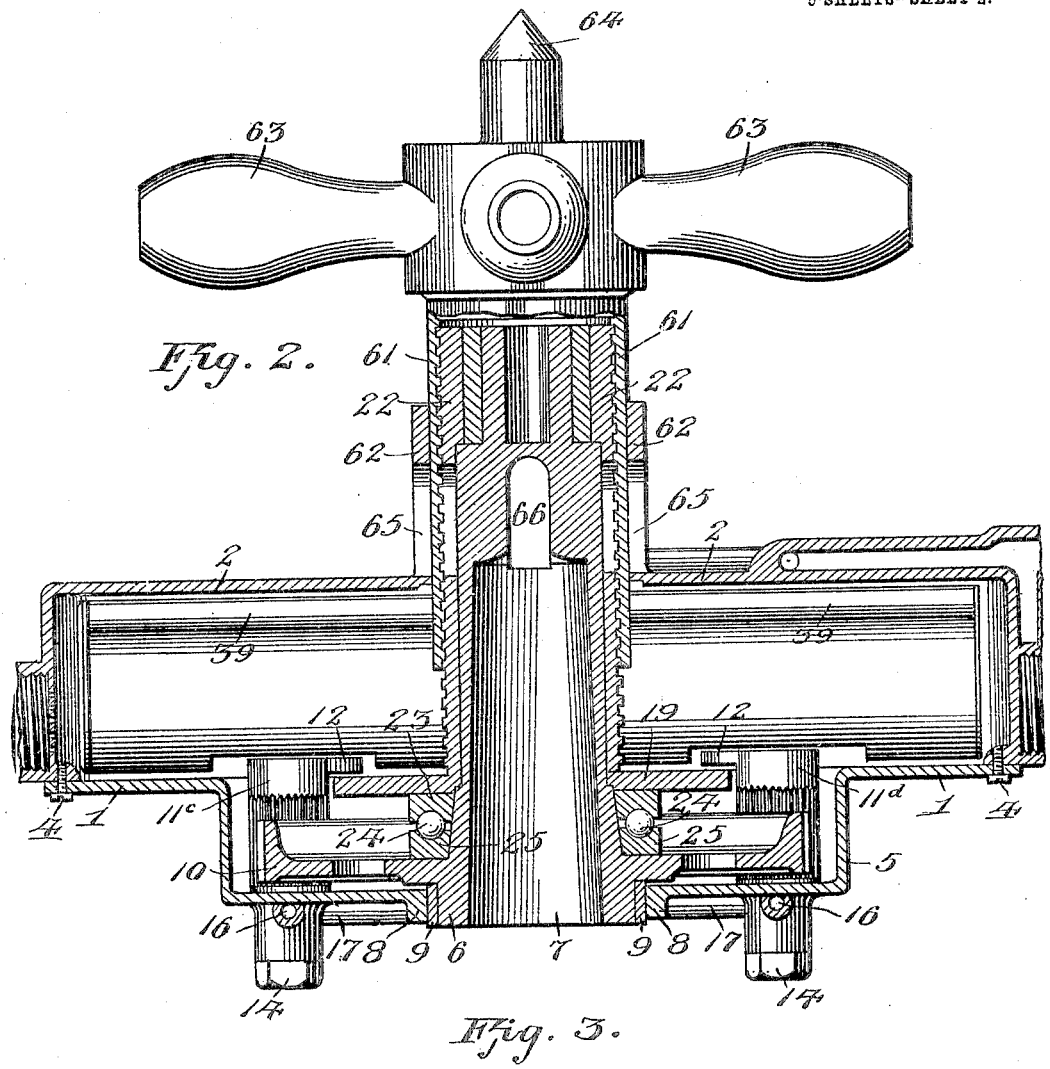
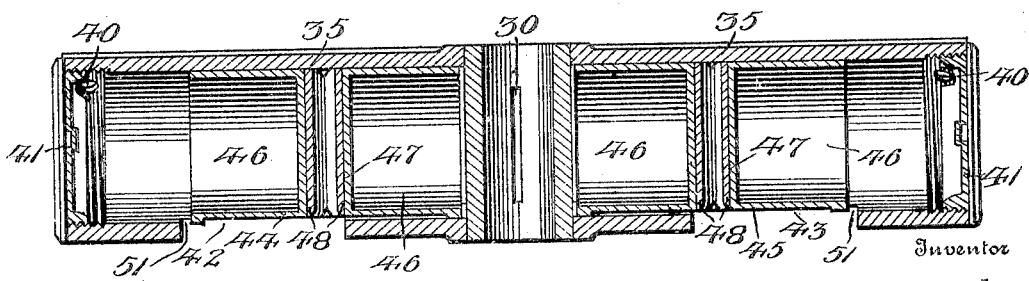
Witnesses
Frank B. Hoffman.
Inventor
Colin Hornal.
By Victor J. Evans
Attorney No. 804,472. PATENTED NOV. 14, 1905.
C. HORNAL.
ENGINE.
APPLICATION FILED NOV. 29, 1904.
5 SHEETS—SHEET 3.
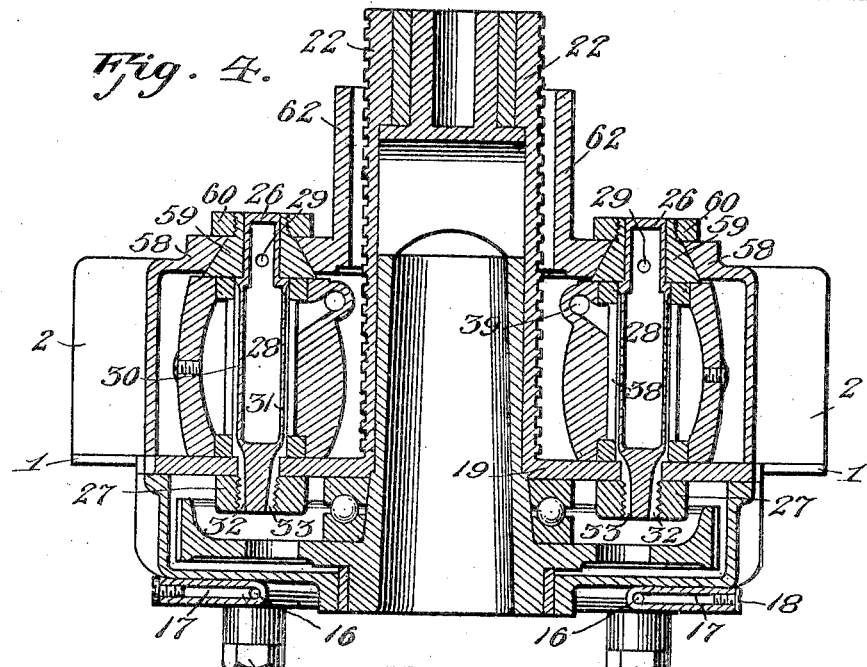
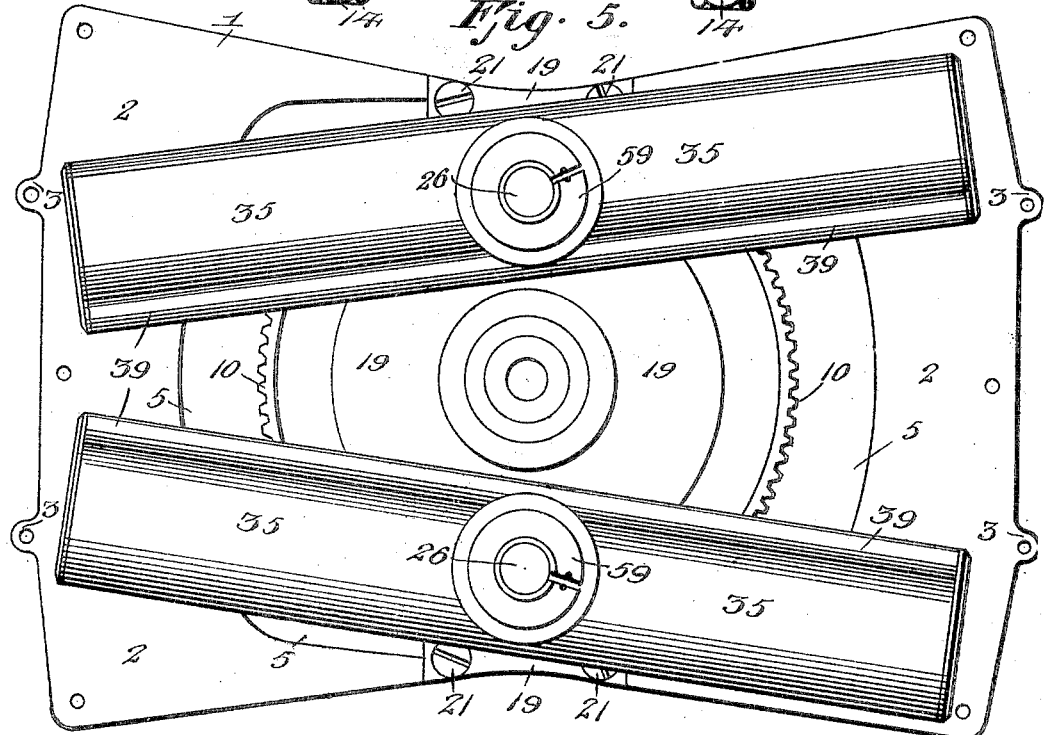
Witnesses.
Frank B. Hoffman.
W. H. Clarke.
Inventor.
Colin Hornal.
By Victor J. Evans
Attorney No. 804,472. PATENTED NOV. 14, 1905.
C. HORNAL.
ENGINE.
APPLICATION FILED NOV. 29, 1904.

5 SHEETS—SHEET 4.

Witnesses
Frank B. Hoffman.
W. H. Clarke.

Inventor
Colin Hornal.
By Victor J. Evans Attorney

No. 804,472. PATENTED NOV. 14, 1905.
C. HORNAL.
ENGINE.
APPLICATION FILED NOV. 29, 1904.

5 SHEETS—SHEET 5.

Witnesses
Frank B. Hoffman.
W. H. Clarke.

Inventor
Colin Hornal.
By Victor J. Evans
Attorney

UNITED STATES PATENT OFFICE.

COLIN HORNAL, OF NASHVILLE, TENNESSEE.

ENGINE.

No. 804,472.  Specification of Letters Patent.  Patented Nov. 14, 1905.

Application filed November 29, 1904. Serial No. 234,768.

*To all whom it may concern:*

Be it known that I, COLIN HORNAL, a citizen of the United States, residing at Nashville, in the county of Davidson and State of Tennessee, have invented new and useful Improvements in Engines, of which the following is a specification.

This invention relates to engines.

Although the ideas of invention herein disclosed are adapted to various embodiments, they have been illustrated for convenience in connection with a portable engine, such as is used in drilling metal, rock, wood, or other material.

The objects of the invention are to improve and simplify the construction of engines.

With the foregoing and other minor objects in view, which will appear as the description proceeds, the invention resides in the combination and arrangement of parts and in the details of construction hereinafter described and claimed as a practical embodiment thereof.

Figure 6:
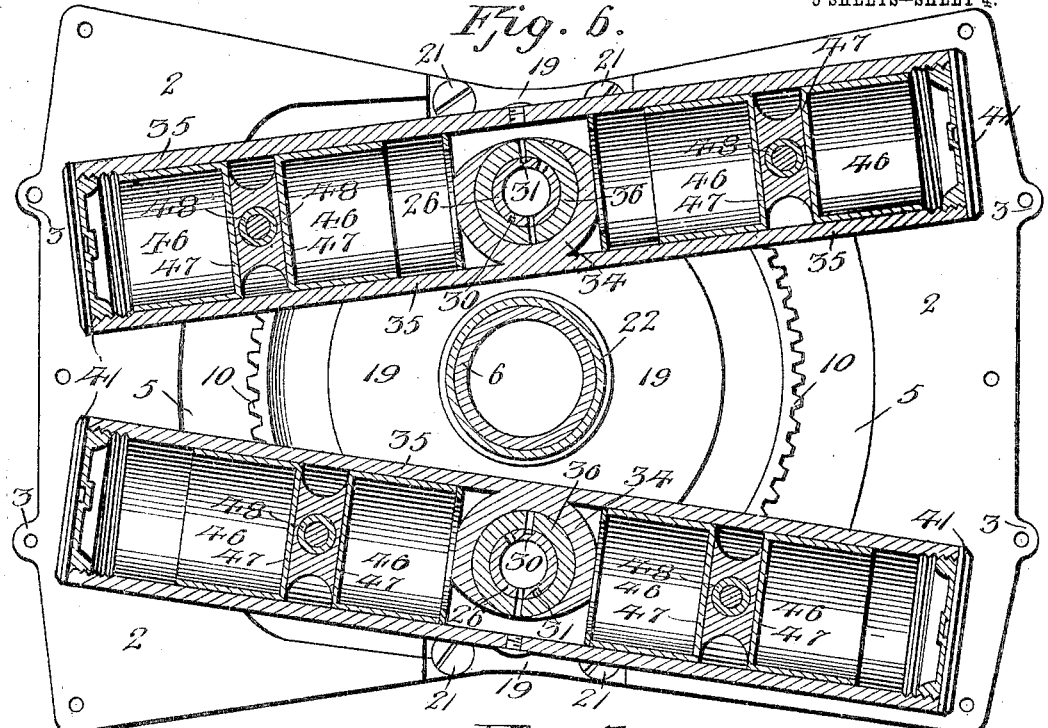
Figure 7:
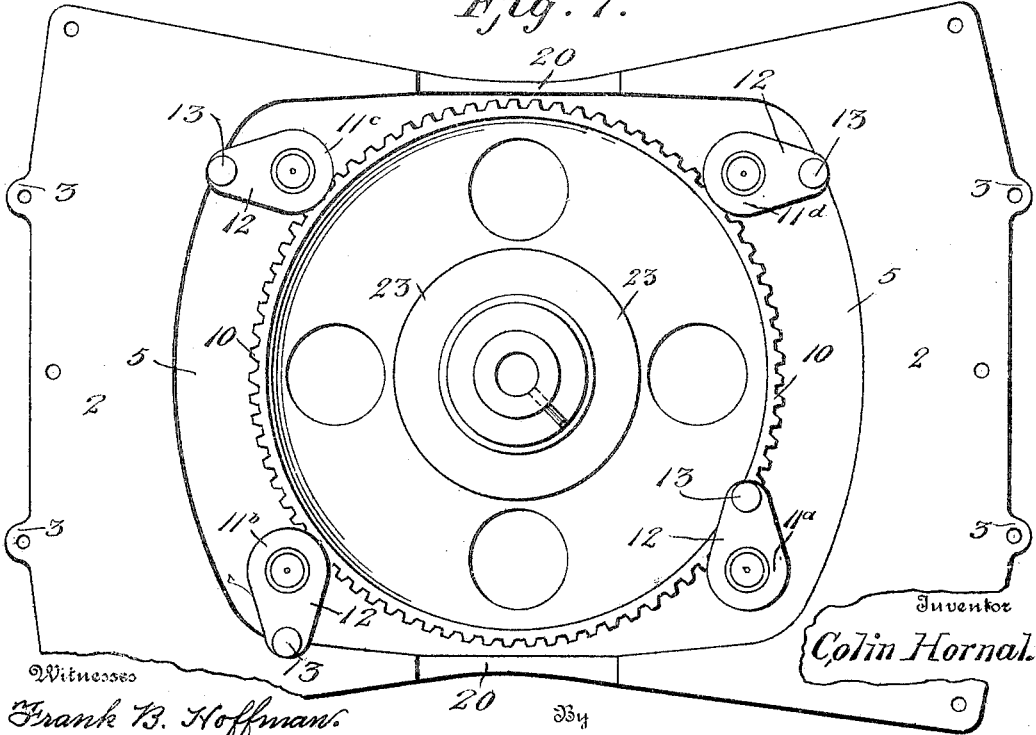
Figure 10:
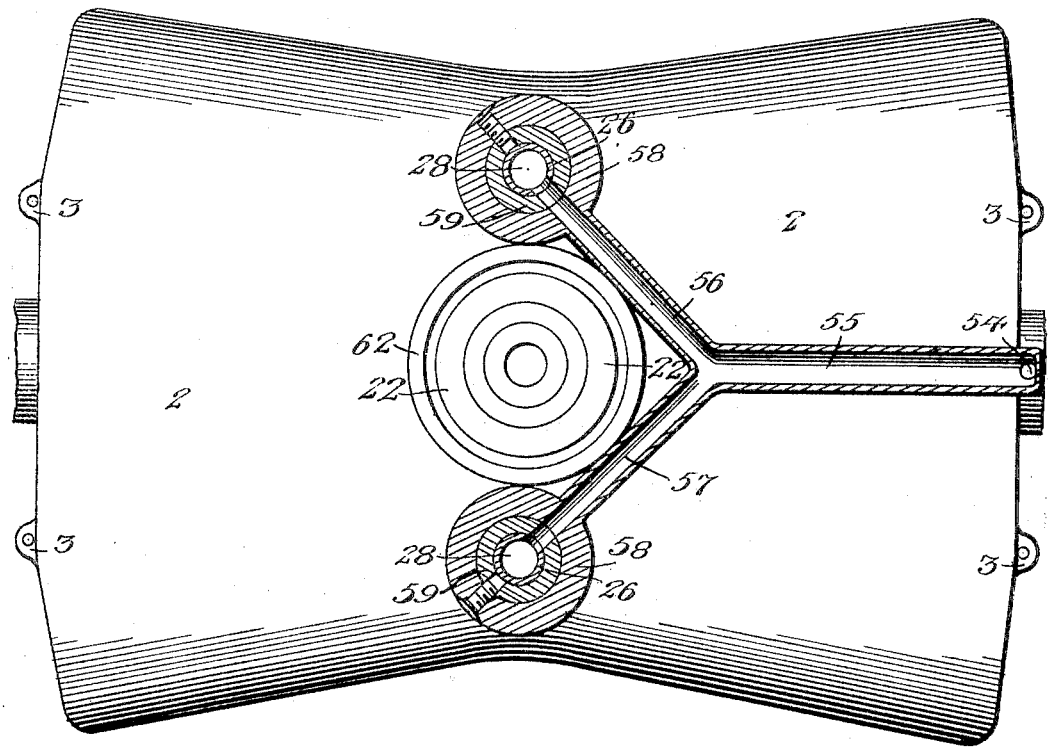
Figure 11:
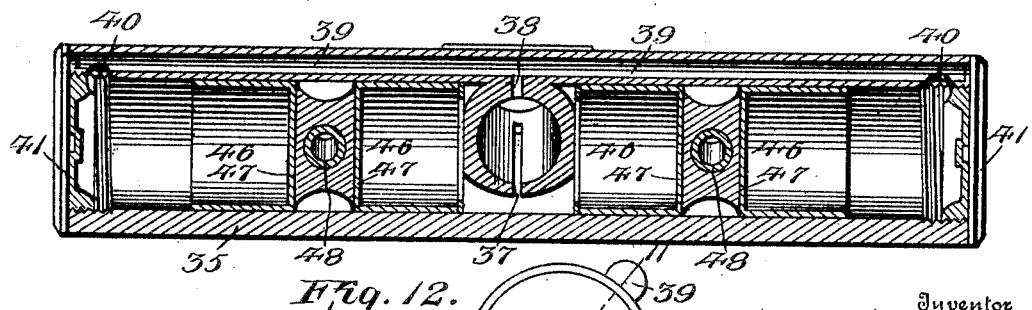
Figure 12:
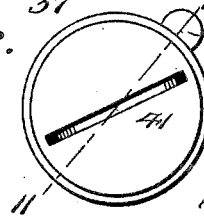

In the accompanying drawings, forming part of this specification, Figure 1 is a side elevation, partly in section, of a portable engine constructed in accordance with the invention. Fig. 2 is a vertical longitudinal section thereof. Fig. 3 is a similar section through one of the cylinders. Fig. 4 is a transverse vertical section through the engine. Fig. 5 is a plan view showing the two cylinders with the cover removed. Fig. 6 is a similar view, the cylinders being shown in horizontal section. Fig. 7 is a similar view with the cylinders removed. Fig. 8 is a side elevation of the bridge-piece. Fig. 9 is a detail perspective view of one of the pistons. Fig. 10 is a plan view, partly in section, of the cover. Fig. 11 is a longitudinal section through one of the cylinders on the line 11 11 of Fig. 12. Fig. 12 is an end elevation of one of the cylinders.

Like reference-numerals indicate corresponding parts in the different views.

The casing in which the cylinders and other operating elements are disposed may be of any suitable form and construction. A convenient form of casing comprising a base 1 and a cover 2 is illustrated in the accompanying drawings, said cover and base being formed with ears or lugs 3, adapted to receive bolts or other suitable fastening devices 4 for detachably connecting the two parts of the casing. As shown in Fig. 2, the base 1 is formed with a central depression 5, which constitutes a chamber adapted to receive a suitable drill or tool holding device.

Any convenient form of tool or drill holding device may be employed. The device illustrated in the drawings comprises a tubular member 6, having an elongated socket 7, into which the shank of the tool or the drill is inserted. The tubular member 6, which is rotatable in the chamber 5, extends at its lower end through a circular bore 8 in the lower portion of said chamber 5, a brass bushing 9 being interposed, preferably, between the tubular member 6 and the bore 8 to prevent undue friction. The tubular member 6 of the drill-holding device is provided with a gear-wheel 10, which is rotatably disposed in the chamber 5, as shown in Fig. 7.

The rotation of the gear-wheel 10 and tool-holding device 6 is effected, preferably, by the use of four pinions—such as $11^a$, $11^b$, $11^c$, and $11^d$—which are arranged adjacent to the periphery of said gear-wheel 10, each of said pinions being provided at its upper end with a laterally-extending arm 12, having a crank-pin 13 thereon. The journal of each pin preferably comprises a bolt 14, which extends vertically upward through the bottom of the chamber 5 and is provided centrally with a bore 15 to permit the passage of oil for lubricating the pinion, as indicated in Fig. 1, the lubricating material being supplied to the bore 15 from the oil-passage 16, having an inlet 17 closed normally by means of a suitable screw-plug 18. It will be understood that any suitable means of lubricating the pinions may be adopted.

Extending transversely across the base 1 above the chamber 5 is a bridge-piece 19, the ends of which are set into suitable slots 20, as indicated in Fig. 7, said bridge-piece being held securely within said slots by means of screws or other suitable fastening devices 21. The bridge-piece 19 is provided at its center with an upwardly-extending sleeve 22, as indicated in Figs. 4 and 8, said sleeve 22 being screw-threaded on its exterior, as shown. The tubular member 6 of the tool-holding device extends upwardly through the sleeve 22, said sleeve thus serving as a journal-socket to steady the tool-receiving device in its rotation. Fastened in any suitable manner to the under portion of the bridge-piece 19 is a collar 23, which is provided in its under surface with an annular groove to receive a series of antifriction-balls 24, which rest upon an annularly-grooved collar 25, secured in any suitable manner to the tubular member 6 of the tool-holding device above the gear-wheel 10, said collars 23 and 25, together with the antifriction-balls 24, serving to produce a suitable thrust-bearing for the tool-holding device. Disposed upon the bridge-piece 19 on each side of the tubular sleeve 22 is a trunnion-bearing 26, as shown in Figs. 4 and 8, each of the trunnion-bearings 26 having a screw-threaded lower end, which extends through the bridge-piece 19 and is held securely in position by means of a nut 27. Each of the trunnion-bearings 26 is formed internally with a pressure-chamber 28, having an inlet 29 and a pair of outlets 30 and 31, said outlets 31 comprising longitudinal slots disposed in opposite sides of the trunnion. Each of the trunnion-bearings 26 is also provided in its periphery with a pair of longitudinally-extending exhaust-grooves 32 and 33, said grooves extending through the bridge-piece 19 and terminating below the nut 27, as indicated in Fig. 4, and serving to permit the escape of exhaust-pressure, as will hereinafter appear. Surrounding each of the trunnion-bearings 26 is a bushing 34, which, as shown in Fig. 6, is secured internally to or formed integral with one side of a cylinder 35, a supplemental brass bushing 36 being interposed between the bushing 34 and the trunnion-bearing 26. The centrally-disposed bushings 34 and 36 of each of the cylinders 35 are formed on one side with an inlet and exhaust port 37, as shown in Fig. 11, said port being in the form of a longitudinal slot which opens into the central portion of the cylinder. At their opposite sides the bushings 34 and 36 are formed with a similar inlet and exhaust port 38, which opens into a passage 39, extending longitudinally of the cylinder and communicating with the opposite ends thereof by means of openings 40. The opposite ends of each of the cylinders 35 are closed by means of suitable screw-plugs 41. Formed in the lower portion of each of the cylinders 35 is a pair of longitudinal slots 42 and 43, as shown in Fig. 3, said slots being disposed on opposite sides of the trunnion-bearing 26. Located in each of the cylinders 35 is a pair of pistons 44 and 45. As shown in Fig. 9, each of the pistons 44 and 45 is tubular in form and is provided in each end with a steam-chamber 46, a partition 47 being formed between the two steam-chambers. The partitions 47 of each piston is formed with a bore having a bushing 48, into which projects the crank-pin 13 of the adjacent pinion $11^a$, $11^b$, $11^c$, or $11^d$. Each of the pistons 44, preferably, is formed in its periphery with a groove 49 suitable for purposes of lubrication and is flattened on its under surface, as shown at 50, to permit the free rotation of the pinion.

The arrangement of the two pistons in each cylinder is such that when fluid-pressure is admitted to the central portion of the cylinder the two pistons will be forced away from each other, and when fluid-pressure is admitted to opposite ends of the cylinder the two pistons will be forced toward each other. The length of each piston and the length of each slot 42 and 43 in the lower portion of cylinder is such that when the piston has reached the limit of its movement in either direction the slot will be uncovered, as indicated at 51 in Fig. 3, in order to permit the escape of excessive pressure, and thus facilitate the movement of the piston in the opposite direction, as will appear more fully hereinafter.

The cover 2 of the engine-casing which incloses the two cylinders 35 is provided at one end with any suitable form of handle 52, which constitutes an inlet for fluid-pressure and at the opposite end with a similar handle 53, which constitutes an outlet or exhaust. The inlet-handle 52, as indicated in Figs. 1 and 10, communicates with a passage 54, which extends vertically upward upon the cover 2 and merges into a passage 55, extending longitudinally of the cover 2 and separating into branch passages 56 and 57, leading into annular collars 58 upon the upper portion of the cover. The upper ends of the trunnion-bearings 26 extend through the collars 58, suitable cone-shaped bushings 59, having screw-threaded upper ends to receive nuts 60, being interposed between the upper ends of the trunnion-bearings and the collars 58. The passages 57 extend through the bushings 59 and communicate with the inlets 29 of the trunnion-bearings 26.

The mechanism by which the improved engine is adjusted toward the work preferably comprises a tubular sleeve 61, which is interiorly screw-threaded and fits over the sleeve 22 upon the bridge-piece 19, said sleeve 61 extending through a collar 62, formed upon the cover 2 of the casing. The sleeve 61 is provided with handles 63 and with a conical projection 64, adapted to be placed against any suitable support when adjusting the tool or drill against the work, as will be apparent to those skilled in the art to which this invention relates.

In order to permit the insertion of a drift or other suitable implement for removing the tool or drill which is contained in the drill-holding device, the collar 62 is slotted, as indicated at 65 in Fig. 2, similar slots being formed in the sleeve 22 and in the tool-holding device 6, as indicated at 66. By turning the sleeve 61 until the several slots rotate together a suitable implement may be inserted for loosening the tool or drill in the drill-holding device.

Constructed as above described the operation of the improved engine is as follows: Steam, compressed air, or other fluid-pressure enters the engine through the handle 52 and traverses the passages 54, 55, and 56, leading to the trunnion-bearings 26. Entering the trunnion-bearings 26 through the inlets 29 the pressure passes from the chamber 28 of the trunnion-bearing through one of the feed-slots thereof into the adjacent cylinder. The arrangement of the two cylinders with respect to the trunnion-bearings is such that when the inlet and exhaust port 38, communicating with the passage 39, leading to the opposite end of the cylinder, is in register with one of the outlet-slots of the trunnion-bearings the opposite inlet and exhaust port 37 of the cylinder is in register with one of the exhaust-grooves 32 or 33 in the trunnion-bearing. For this reason the fluid-pressure enters the passage 39 and is conducted to the opposite ends of the cylinder, thus forcing the two pistons together, the exhaust-pressure being permitted to pass through the exhaust-groove of the trunnion-bearing into the engine-casing, from which it escapes through the handle 53. As soon as the two pistons have been forced to the limit of their movement the slots in the cylinder become uncovered, thus permitting the escape of excessive pressure and facilitating the movement of the pistons in the opposite direction. It will be understood that each of the cylinders swings in a horizontal direction upon its trunnion-bearing, thus causing the inlet and exhaust port on one side thereof to register with the exhaust-groove of the trunnion-bearing at the same time that the opposite inlet and exhaust port registers with one of the outlet-slots of the trunnion-bearing. For this reason the employment of a separate automatic valve for regulating the entrance and exhaust of the fluid-pressure is avoided.

From the foregoing description it will be apparent that the improved engine of this invention dispenses with the employment of piston-rods in the cylinders containing the reciprocating piston. Furthermore, it will be apparent that two cylinders each containing a pair of pistons and employing but a single valve are utilized, for which reason the power of four pistons is secured with the use of but two valves.

Changes in the precise embodiment of invention illustrated and described may be made within the scope of the following claims without departing from the spirit of the invention or sacrificing any of the advantages thereof.

Having thus described the invention, what is claimed is—

1. An engine having a cylinder formed with a pair of slots, a pair of pistons in said cylinder adapted to move simultaneously in opposite directions, one of said pistons being disposed adjacent to each of said slots and adapted, when at the extreme of its movement in either direction to uncover said slot, and means for transmitting power from said pistons.

2. An engine having a trunnion-bearing provided with supply and exhaust means, a cylinder having a centrally-disposed bushing connected with one side thereof, said bushing surrounding said trunnion and being formed with a pair of inlet and exhaust ports, one of said inlet and exhaust ports communicating with the central portion of said cylinder and the other inlet and exhaust port communicating with the opposite ends thereof, and a pair of pistons in said cylinder on opposite sides of said bushing.

3. An engine having a hollow trunnion-bearing, formed with outlet-slots and exhaust-grooves, a cylinder having a centrally-disposed bushing connected with one side thereof, said bushing surrounding said hollow trunnion and being formed with a pair of inlet and exhaust ports, one of said inlet and exhaust ports communicating with the central portion of said cylinder, and the other inlet and exhaust port communicating with the opposite ends thereof, a pair of pistons in said cylinder on opposite sides of said bushings, and means for transmitting power from said pistons.

4. An engine having a hollow trunnion-bearing formed with outlets and exhaust-grooves, a cylinder having a pair of slots therein, a centrally-disposed bushing connected with one side thereof and surrounding said hollow trunnion-bearing, said bushing being formed with a pair of outlet and exhaust passages, one of said outlet and exhaust passages communicating with the central portion of the cylinder, and the other outlet and exhaust passage communicating with the opposite ends thereof, a pair of pistons in said cylinder adjacent to the slots thereof, said pistons being disposed on opposite sides of said bushing, and the arrangement of said pistons with respect to said slots being such that the slots are uncovered when the pistons are at the extreme limit of their movement in either direction, and means for transmitting power from said pistons through said slots.

5. An engine having a pair of hollow trunnion-bearings, each formed with a plurality of outlets and exhaust-grooves, a pair of cylinders, each having a plurality of slots therein, each of said cylinders having a centrally-disposed bushing surrounding one of said trunnion-bearings and being formed with a pair of inlet and exhaust ports, one of which communicates with the central portion of the cylinder, and the other of which communicates with the opposite ends thereof, a pair of pistons in each of said cylinders on opposite sides of the bushing thereof, a crank connected with each of said pistons and extending through the adjacent slot in the cylinder, a pinion connected with each of said cranks, a gear-wheel intermeshed with each of the pinions, and a tool-holding device operated by the gear-wheel.

6. An engine having a casing, comprising a base and a cover, the base being formed with a chamber, a rotary tool-holding device in said chamber, a gear-wheel connected with said tool-holding device, a plurality of pinions disposed adjacent to the periphery of said gear-wheel, and each having a crank, a bridge-piece extending across said chamber and having a tubular sleeve formed exteriorly with screw-threads and being adapted to receive the rotary tool-holding device, an exteriorly-screw-threaded sleeve surrounding said first-mentioned sleeve, and having a pointed projection thereon, handles on said last-mentioned sleeve, a pair of hollow trunnion-bearings on said bridge-piece, each provided with outlets and exhaust-grooves, a pair of cylinders, each having a centrally-disposed bushing surrounding one of said trunnion-bearings, and having a pair of outlet and exhaust ports, one of which communicates with the central portion of the cylinder, and the other with the opposite ends thereof, a pair of pistons in each of said cylinders arranged on opposite sides of the bushing thereof, and each connected with the cranks on one of said pinions, and means for supplying fluid-pressure to each of said hollow trunnion-bearings.

In testimony whereof I affix my signature in presence of two witnesses.

COLIN HORNAL.

Witnesses:
 JOHN RANKIN,
 R. W. CLARK.